US012317397B2

(12) United States Patent
Prabhu et al.

(10) Patent No.: US 12,317,397 B2
(45) Date of Patent: May 27, 2025

(54) METHOD OF COOLING ELECTRIC INDUCTION MELTING AND HOLDING FURNACES FOR REACTIVE METALS AND ALLOYS

(71) Applicant: Inductotherm Corp., Rancocas, NJ (US)

(72) Inventors: Satyen N. Prabhu, Voorhees, NJ (US); Joseph T. Belsh, Spring Hill, TN (US); Peter Aruanno, Hammonton, NJ (US)

(73) Assignee: INDUCTOTHERM CORP., Rancocas, NJ (US)

( * ) Notice: Subject to any disclaimer, the term of this patent is extended or adjusted under 35 U.S.C. 154(b) by 764 days.

(21) Appl. No.: 17/680,519

(22) Filed: Feb. 25, 2022

(65) Prior Publication Data

US 2022/0183118 A1 Jun. 9, 2022

Related U.S. Application Data

(62) Division of application No. 14/703,688, filed on May 4, 2015, now Pat. No. 11,272,584.

(60) Provisional application No. 62/117,883, filed on Feb. 18, 2015.

(51) Int. Cl.

| | |
|---|---|
| ***H05B 6/26*** | (2006.01) |
| ***H05B 6/28*** | (2006.01) |
| ***H05B 6/36*** | (2006.01) |
| ***H05B 6/42*** | (2006.01) |

(52) U.S. Cl.
CPC ................. *H05B 6/26* (2013.01); *H05B 6/28* (2013.01); *H05B 6/367* (2013.01); *H05B 6/42* (2013.01)

(58) Field of Classification Search
CPC . H05B 6/26; H05B 6/28; H05B 6/367; H05B 6/42
See application file for complete search history.

(56) References Cited

U.S. PATENT DOCUMENTS 3,800,856 A * 4/1974 Mizikar ............. B22D 11/1246 164/444
3,875,322 A * 4/1975 Sundberg ................. H05B 6/18 65/337

(Continued)

OTHER PUBLICATIONS

IP.com search (Year: 2025).*

*Primary Examiner* — Elizabeth M Kerr
*Assistant Examiner* — Keith Brian Assante
(74) *Attorney, Agent, or Firm* — Robert J. Everling

(57) ABSTRACT

A method of cooling an electric induction furnace for melting and holding a reactive metal or alloy is provided where the electric induction furnace has an upper furnace vessel and an induction coil in a modular inductor furnace is positioned below the upper furnace vessel with a melt-containing vessel positioned inside the induction coil with a gap between the outside surface of the melt-containing vessel and the inside surface of the induction coil that is used to circulate a cooling fluid for cooling the melt-containing vessel to inhibit leakage of the reactive metal or alloy melt from the melt-containing vessel. The melt-containing vessel can be integrated with a cooling system for cooling the melt-containing vessel. Modularity of the melt-containing vessel, induction coil and cooling system facilitates servicing of the modular inductor furnace without disassembly of the entire electric induction furnace.

19 Claims, 8 Drawing Sheets

(56) References Cited

U.S. PATENT DOCUMENTS

| | | | | | |
|---|---|---|---|---|---|
| 4,444,377 | A * | 4/1984 | Groteke | F27B 14/10 | 222/629 |
| 4,524,819 | A * | 6/1985 | Yoshimura | B22D 11/108 | 164/475 |
| 4,622,679 | A * | 11/1986 | Voss | H05B 6/24 | 373/153 |
| 4,633,481 | A * | 12/1986 | Schwenninger | C03B 5/021 | 373/152 |
| 5,994,682 | A * | 11/1999 | Kelly | H05B 6/42 | 174/15.7 |
| 6,148,018 | A * | 11/2000 | Garcia | H05B 6/067 | 373/145 |
| 7,745,765 | B2 * | 6/2010 | Kisner | C21D 1/04 | 219/635 |
| 8,302,657 | B2 * | 11/2012 | Bes | B22D 11/04 | 164/415 |
| 2001/0002200 | A1 * | 5/2001 | Stanley | H05B 6/24 | 373/153 |
| 2003/0217999 | A1 * | 11/2003 | Jones | F27B 17/0033 | 219/390 |
| 2006/0126700 | A1 * | 6/2006 | Wilcox | H05B 6/26 | 373/151 |
| 2008/0182022 | A1 * | 7/2008 | La Sorda | C22B 9/006 | 427/248.1 |
| 2009/0118126 | A1 * | 5/2009 | Burke | H05B 6/42 | 505/211 |
| 2011/0168678 | A1 * | 7/2011 | Takeda | B23K 9/164 | 219/74 |
| 2013/0239616 | A1 * | 9/2013 | Meyer | F27B 14/20 | 65/162 |
| 2013/0294473 | A1 * | 11/2013 | Cho | G21F 9/308 | 373/142 |
| 2015/0147227 | A1 * | 5/2015 | Tilak | H05B 6/26 | 420/533 |

* cited by examiner

METHOD OF COOLING ELECTRIC INDUCTION MELTING AND HOLDING FURNACES FOR REACTIVE METALS AND ALLOYS

CROSS REFERENCE TO RELATED APPLICATIONS

This is a divisional application of Application No. 14/703,688, filed May 4, 2015, which application claims the benefit of U.S. Provisional Application No. 62/117,883, filed Feb. 18, 2015, both of which applications are hereby incorporated herein by reference in their entireties.

FIELD OF THE INVENTION

The present invention is related to electric induction melting and holding furnaces for reactive metals and alloys.

BACKGROUND OF THE INVENTION

Highly reactive metals such as the alkali group in the periodic table can be combined with a base metal to form a reactive alloy such as aluminum-lithium (Al—Li). The reactive alloy can be favored over the base metal, for example, for forming castings with improved characteristics such as increased strength or reduced weight.

Various types of electric induction furnaces can be used to heat and melt reactive alloys. Since all of the alkali group metals and aluminum react explosively to some degree with water cooling systems associated with Joule heat removal from current flow in inductors used in electric induction furnaces, alternate cooling fluids can be used to avoid explosive events that can arise when, for example, the induction furnace is operated beyond the limitations of its design.

A coreless induction furnace can use a double lining arrangement comprising a working lining and a backup lining. The inner working lining makes contact with the reactive alloy heated or melted within the crucible while the backup lining forms a barrier between the inner working lining (and any reactive metal or alloy melt that may leak into the working lining during abnormal operating conditions) and the furnace's induction coil(s). The refractory composition of the inner working lining is selected to minimize reaction with the reactive alloy melt but will wear in use and will be replaced periodically whereas the refractory composition of the outer backup lining is selected for durability since the working lining will be replaced before degradation of the backup lining in a properly operated furnace.

If chemical reaction between the reactive alloy in the crucible with the composition of the refractory inner working lining results in leaking of the reactive alloy melt into the inner working lining, frequency control of the alternating current supplied to the furnace's induction coil(s) can be used to regulate the degree of degradation of the inner working lining from the chemical reaction.

Alternatively a susceptor induction furnace such as an ACUTRAK® heating and melting furnace available from Inductotherm Corp. (Rancocas, New Jersey USA) can be adapted for heating of reactive alloys.

U.S. Pat. No. 5,425,048 discloses an induction heating furnace that comprises an induction coil assembly and a ladle having a metallic shell that supports a crucible holding metal to be heated by the furnace. The ladle is readily separated from the induction coil assembly so that the heated metal may be conveniently and reliably moved among operational stations. The induction coil assembly has a preselected length which is less than the length of the shell. The induction coil assembly surrounds, but does not touch the shell and generates an electromagnetic induction field. The induction coil assembly comprises a coil, upper and lower yokes and an intermediate yoke coextensive with the coil. The upper and lower yokes are separated from each other and electromagnetically coupled together by the intermediate yoke. The upper, lower and intermediate yokes each comprise stacked laminates formed of sheets of ferrous material.

U.S. Pat. No. 8,242,420 discloses an apparatus and process for directional solidification of silicon by electric induction susceptor heating in a controlled environment. A susceptor vessel is positioned between upper and lower susceptor induction heating systems and a surrounding induction coil system in the controlled environment. Alternating current selectively applied to induction coils associated with the upper and lower susceptor heating systems, and the induction coils making up the surrounding induction coil system, result in melting of the silicon charge in the vessel and subsequent directional solidification of the molten silicon. A fluid medium can be directed from below the vessel towards the bottom, and then up the exterior sides of the vessel to enhance the directional solidification process.

United States Patent Application Publication No. 2012/0300806 discloses an electric induction furnace for heating and melting electrically conductive materials that is provided with a lining wear detection system that can detect replaceable furnace lining wear when the furnace is properly operated and maintained.

BRIEF SUMMARY OF THE INVENTION

In one aspect the present invention is an electric induction melting and holding furnace for reactive metals alloys where the furnace comprises an upper furnace vessel; an induction coil positioned below the upper furnace vessel; and a melt-containing vessel positioned inside the induction coil and communicably connected to the upper furnace vessel, wherein the positioning of the melt-containing vessel inside the induction coil defines a gap between an outside surface of the melt-containing vessel and an inside surface of the induction coil.

In another aspect the present invention is an electric induction melting and holding furnace for reactive metals and alloys and a method of making the electric induction furnace where the furnace comprises an upper furnace vessel; an induction coil positioned below the upper furnace vessel; and a melt-containing vessel positioned inside the induction coil and communicably connected to the upper furnace vessel, wherein the positioning of the melt-containing vessel inside the induction coil defines a gap between an outside surface of the melt-containing vessel and an inside surface of the induction coil, and the melt-containing vessel and induction coil form part of an integrated inductor furnace with a cooling system.

In another aspect the present invention is an electric induction melting and holding furnace for reactive metals and alloys and a method of making the electric induction furnace where the furnace comprises an upper furnace vessel; an induction coil positioned below the upper furnace vessel; and a melt-containing vessel positioned inside the induction coil and communicably connected to the upper furnace vessel, wherein the positioning of the melt-containing vessel inside the induction coil defines a gap between an outside surface of the melt-containing vessel and an inside surface of the induction coil, and the melt-containing vessel and induction coil form part of a modular inductor furnace with a cooling system. A furnace servicing system is optionally provided for servicing the modular components of the inductor furnace.

The above and other aspects of the invention are set forth in this specification and the appended claims.

BRIEF DESCRIPTION OF THE SEVERAL VIEWS OF THE DRAWINGS

FIG. 1(*b*) is a partial cross sectional view of another embodiment of an electric induction furnace of the present invention.

FIG. 1(*c*) is a cross-sectional view of a modular inductor furnace of the present invention shown in FIG. 1(*a*) illustrating a fluid source with supply to a feed port and return from a discharge port.

FIG. 2(*b*) is a cross sectional view of a modular inductor furnace used in the electric induction furnace shown in FIG. 2(*a*) where the modules are shown separated from each other.

FIG. 2(*c*) is a cross-sectional view of a modular inductor furnace of the present invention shown in FIG. 2(*a*) with an optional in-line dehumidifier.

DETAILED DESCRIPTION OF THE INVENTION

Figure 1A:
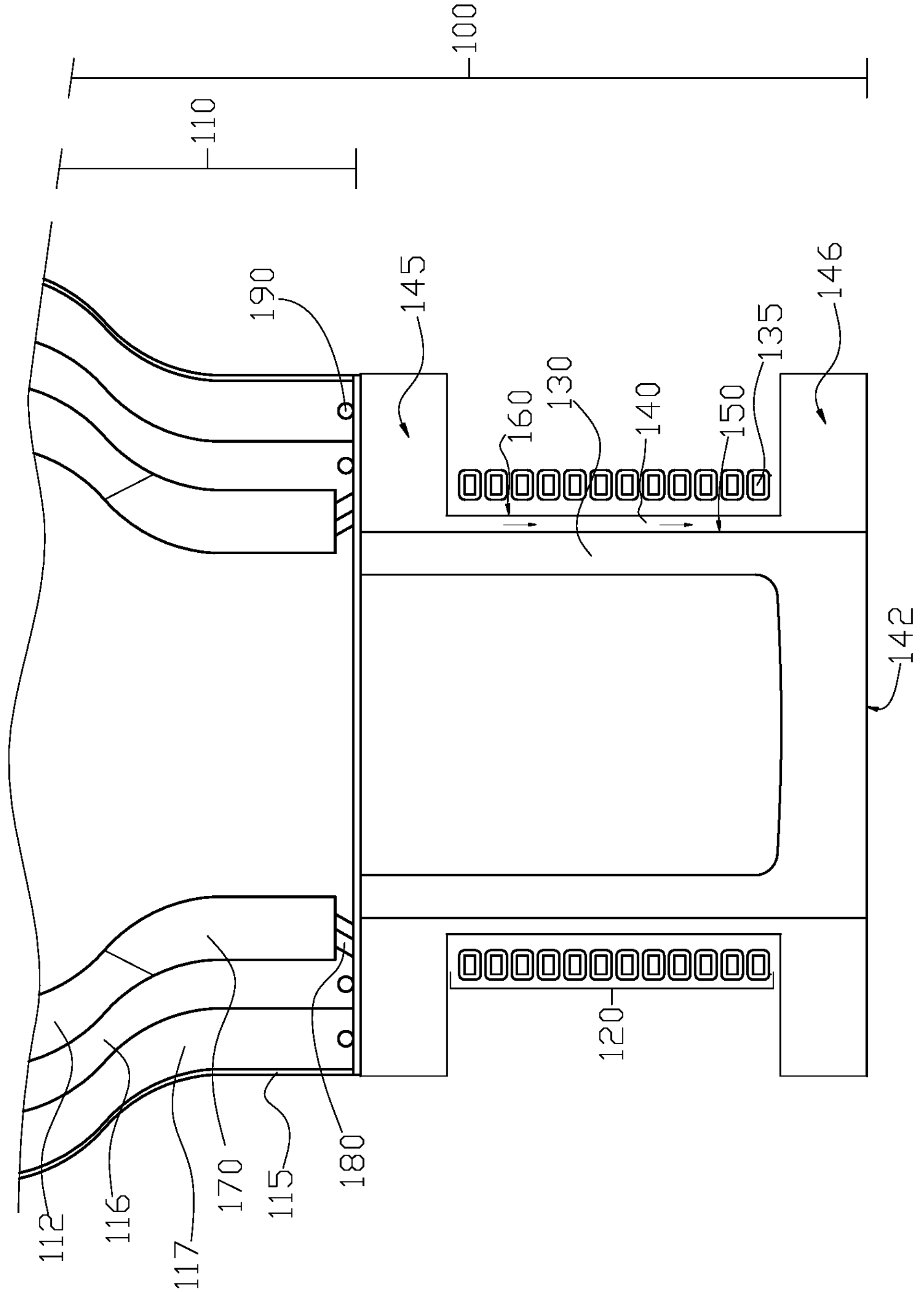
FIG. 1(*a*) is a partial cross sectional view of one embodiment of an electric induction furnace of the present invention.
Figure 1B:
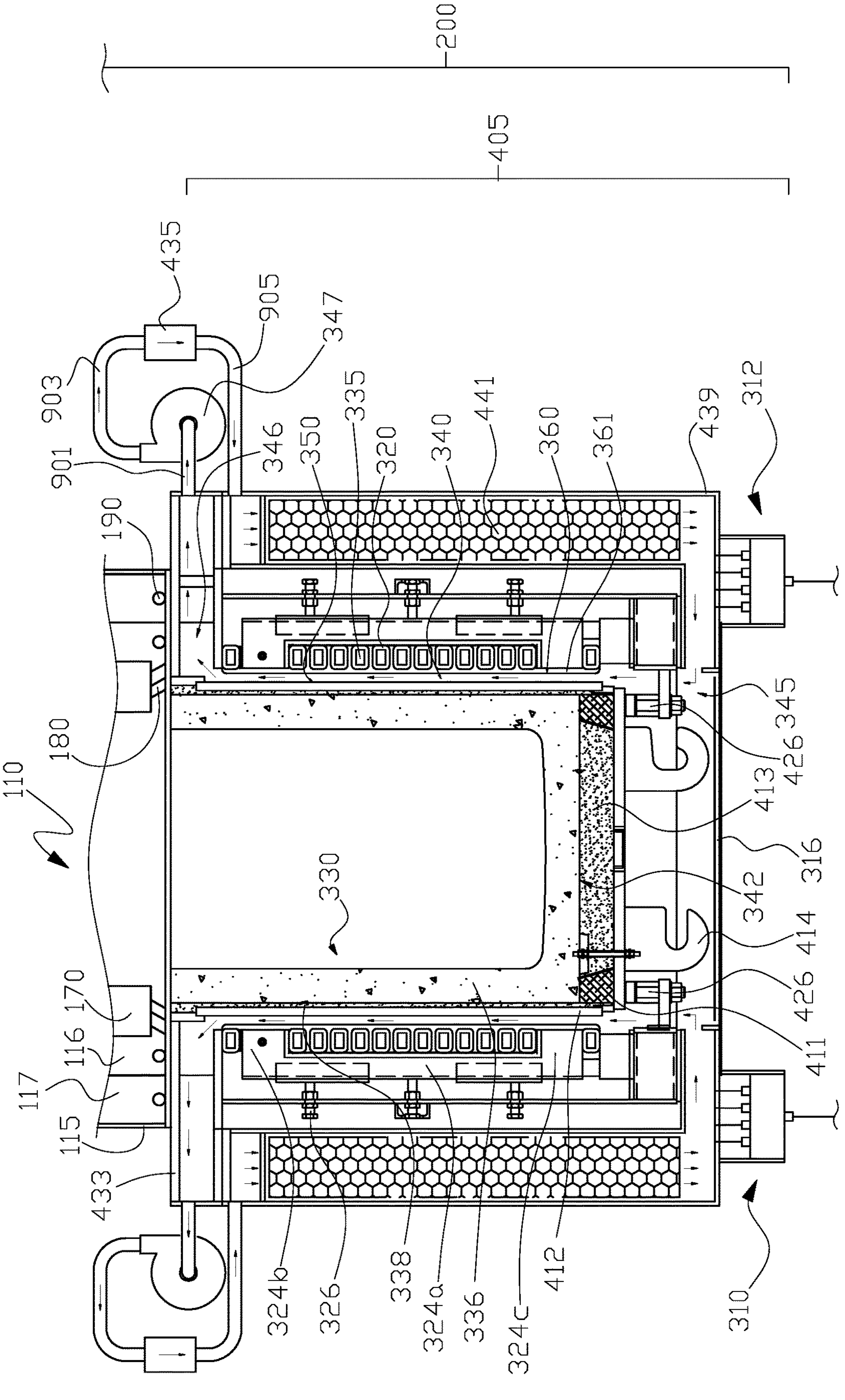
Figure 1C:
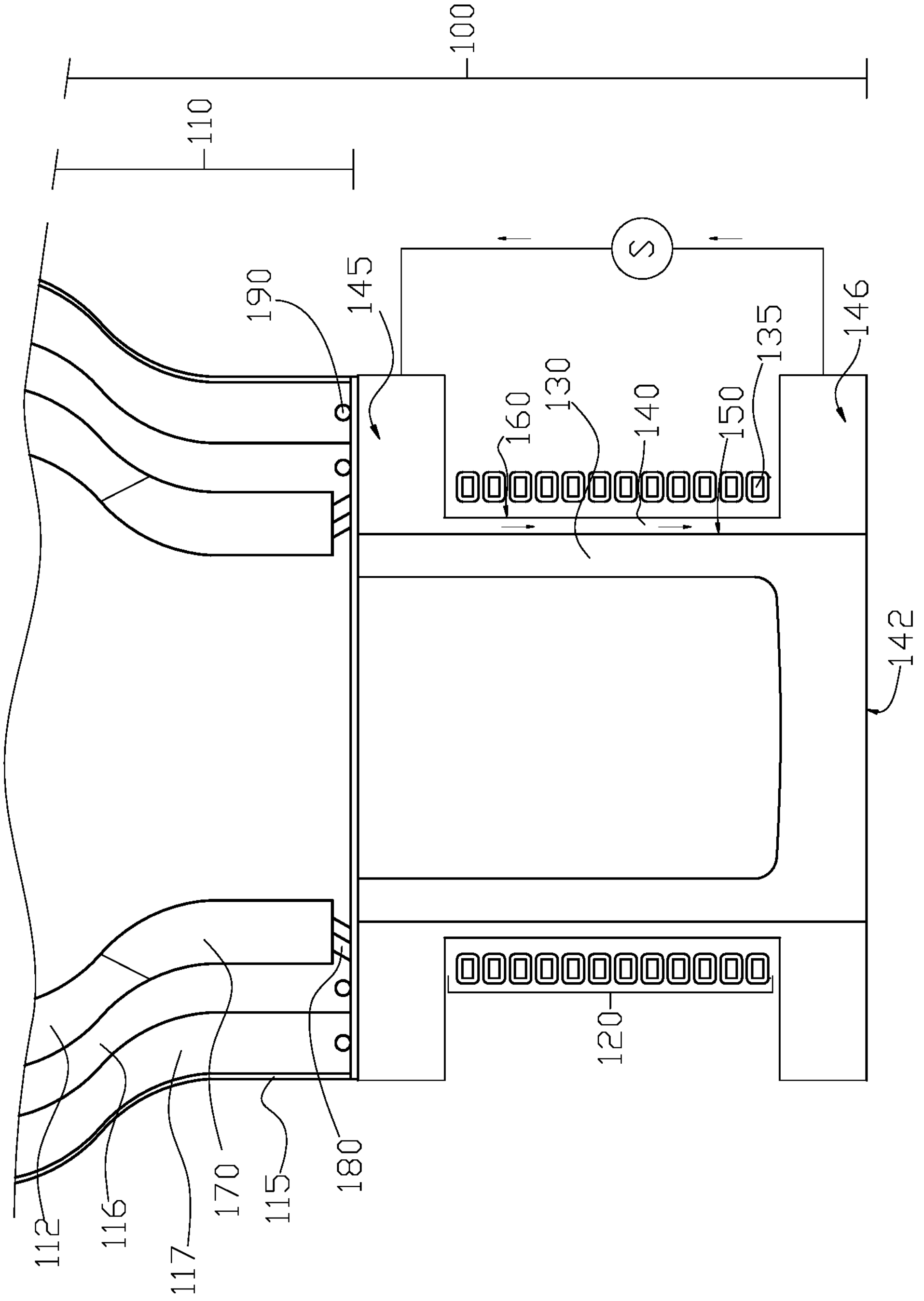

FIG. 1(*a*) shows a partial cross sectional side view of an embodiment of an electric induction furnace for melting and holding reactive alloys. In this embodiment, induction furnace 100 is a two-part furnace with a bottom-located inductor. Induction furnace 100 is capable of operating in a high and/or a low frequency mode ranging from 200 hertz to 80 hertz. Induction furnace 100, in this embodiment, includes upper furnace vessel 110 (shown partially in FIG. 1(*a*)), induction coil 120 positioned below upper furnace vessel 110 (as viewed); and lower melt-containing vessel 130 placed inside induction coil 120 and communicably connected to upper furnace vessel 110. Identification of the inductor furnace as a bottom-located induction type refers to the positioning or placement of only the lower or melt-containing vessel 130 inside induction coil 120 rather than both melt-containing vessel 130 and upper furnace vessel 110. The top of upper furnace vessel 110 (which is not shown in FIG. 1(*a*)) may terminate in a cover.

In one embodiment, melt-containing vessel 130 has a generally cylindrical shape with a representative interior diameter of 10 inches to 50 inches depending, for example, on a furnace melt rate requirement for a specific application.

In the embodiment shown in FIG. 1(*a*) induction coil 120 is a coiled induction coil defined by one or more coils having lumen or opening 135 through which a coolant such as a liquid coolant of water or glycol or a gaseous coolant such as a refrigerant is introduced (for example, by pumping the coolant through opening 135). In another embodiment, induction coil 120 may be a solid core coil or an externally air cooled coil. In one embodiment, induction coil 120 has a generally cylindrical shape having an interior diameter that accommodates melt-containing vessel 130.

Illustrated in the embodiment of induction furnace 100 is gap 140 between the outside surface 150 of the melt-containing vessel 130 and inside surface 160 of induction coil 120. Gap 140 is operable to allow a fluid to be circulated, entering from feed port 145 connected to a fluid source S as shown in FIG. 1(*c*) and exiting from discharge port 146 to the fluid source S with feed port 145 and discharge port 146 associated with gap 140, respectively. In one embodiment, gap 140 is at least one-half inch (0.5"), preferably 1.25 inches to 1.5 inches wide. Circulated in one embodiment means fluid is introduced at feed port 145 and moves within gap 140 around melt-containing vessel 130 and exits at discharge port 146 to waste. In another embodiment, circulated means fluid is introduced at feed port 145 and moves through gap 140 around melt-containing vessel 130, exits at discharge port 146 and is then reintroduced into feed port 145 (via a circulation loop). In either embodiment, it is desired that the fluid is circulated or moved around a portion, in other embodiments an entire portion, or substantially an entire portion of melt-containing vessel 130. In this manner, the liquid is operable to cool an exterior of melt-containing vessel 130. To aid in the circulation of the fluid around melt-containing vessel 130, baffles may be added that extend, for example, from the inside surface 160 of induction coil 120 and direct the fluid around outer surface 150 of melt-containing vessel 130.

The embodiment illustrated in FIG. 1(*a*) has one feed port and one discharge port. In another embodiment, there may be more than one feed port and/or discharge port.

In one embodiment, the fluid circulated through gap 140 is an inert gas. At least one inert gas selected from the group consisting of argon, helium, neon, krypton, xenon, and radon is circulated through the gap between the induction coil and the melt-containing vessel. The circulating gas has preferably at least 5 percent helium in it to improve the heat transfer capability.

In one embodiment, the circulating gas comprises a mixture of argon and helium. In another embodiment, the circulating gas is air. In yet another embodiment, the gas is air or nitrogen and an inert gas such as helium.

A representative circulation mechanism is run continuously so long as the furnace is at a temperature of 300° F. or over. The circulated fluid exiting from discharge port 146 associated with melt-containing vessel 130, in one embodiment, is cooled outside of (remote from) the furnace and re-circulated back into the gap (that is, introduced into feed port 145 and gap 140). In one embodiment, a representative flow rate of an inert gas is of the order of 12,000 cubic feet per minute (cfm) and the temperature of the outer surface of the melt-containing vessel is maintained below 150° F. This assures maintaining a freeze plane of the molten reactive alloy well inside the refractory lining of melt-containing vessel 130. In one embodiment, moisture from a circulated gas may be removed before it is re-circulated with the use of an in-line dehumidifier. For certain reactive alloys that do not contain reactive elements that are highly reactive in air, the fluid circulated through gap 140 can be atmospheric air input at ambient temperature and exhausted to the atmosphere. In this disclosure reactive elements include elements that violently react with water, hydrogen or a component of air (for example nitrogen or oxygen) at high temperature. A representative flow rate of such air will be about 12,000 cfm or as appropriate to keep the outside temperature of melt-containing vessel 130 at about 150° F. or lower.

In other embodiments of the invention the locations of feed port 145 and discharge port 146 are reversed so that feed port 145 is located adjacent to the bottom of gap 140 and discharge port 146 is located adjacent to the top of gap 140.

The presently described furnace vessel and method of circulating gas improve the safety of melting reactive metals or alloys in a properly operated furnace by minimizing or eliminating ingredients that must be present for an explosion to occur.

By maintaining a freeze plane within a melt-containing vessel 130, and preferably within the vessel wall, well away from an outer portion of the vessel wall, the opportunity for reactive alloy melt to escape from the vessel is inhibited. Such escape and contact with induction coil 120 could otherwise be catastrophic.

In one embodiment, melt-containing vessel 130 has an exterior surface that is hoop-wrapped with tightly wound double tweed high temperature fiberglass cloth cemented to an exterior of the containing vessel with a silicon carbide based high temperature refractory adhesive. Melt-containing vessel 130 is provided with a reactive metal or alloy melt resistant working lining that, in one embodiment, has an electrical resistivity of between about 1,000 and about 10,000 micro ohm centimeters. In another embodiment, the resistivity is over 1,000,000 micro ohm centimeters. In one embodiment, a working lining of melt-containing vessel 130 is a refractory ceramic.

To detect a leak or bleed out of molten reactive metal or alloy from melt-containing vessel 130, at least one electrical conducting grid (net) of mica clad electrical conductors is placed at or about outside surface 150 of the melt-containing vessel 130, and the electrically conducting grid defined by the at least one grid of mica clad conductor net is connected to an electrical circuit to detect leakage of the melt. Such circuit may be linked to an alarm through, for example, a controller. Representatively, the mica grid is connected to an alarm system and works as a leak detection device by completing the electrical circuit between the leaked molten reactive metal or alloy and the furnace system's electrical ground potential when the leaked molten metal makes contact with the mica grid. In one embodiment, to assure further safety of operation, multiple grids of mica clad conductors are placed in at least three locations including: the outer cylindrical surface of melt-containing vessel 130; bottom 142 of the melt-containing vessel 130; and at inside surface 160 of induction coil 120.

If required in a particular application of an electric induction furnace of the present invention, a vacuum-generating device for degassing of the reactive alloy melt in electric induction furnace 100 can be used. The vacuum-generating device applies vacuum to a top surface of the reactive alloy melt in induction furnace 100 which top surface may be near the top (not shown in the drawings) of upper furnace vessel 110. Another method used for furnace degassing is to sparge argon gas using gas diffusor blocks of graphite or silicon carbide in the furnace.

Upper furnace vessel 110 and melt-containing vessel 130 are communicably connected with interface ring 170 of, for example, silicon carbide and thermal ring-shaped gasket 180. The mating interface may be further sealed with one or more rope gaskets 190 (for example, titanium rope gaskets).

In the embodiment shown in FIG. 1(*a*), electric induction furnace 100 can be of the tilting type, for example, with tilting apparatus to accomplish horizontally oriented axial tilting (about a pour axis) located near the top (not shown in the figure) of upper furnace vessel 110.

In one embodiment, a clean out (or drossing) port can be located at or near the upper end (not shown in the drawing) of upper furnace vessel 110 and steel shell 115. In one embodiment, the clean out port is located opposite to the pour axis.

Upper furnace vessel 110 (partially shown in FIG. 1(*a*)) functions as a thermally insulated containment vessel for a reactive alloy placed within furnace 100. A cover (not shown in FIG. 1(*a*)) can be provided over the interior open top of upper furnace vessel 110 to seal the furnace atmosphere for a controlled environment. In this embodiment upper furnace vessel 110 comprises structurally supporting shell such as steel shell 115 and one or more thermal insulation layers, for example, inner working liner 112 with a composition selected for resistance to the reactive alloy in the upper furnace vessel; intermediate (back-up) layer 116; and outer (back-up) layer 117 adjacent to steel shell 115. Either layer 116 or 117 (or both layers) can be formed from a high temperature compressible refractory to allow for expansion and contraction of inner working liner 112.

In one use of electric induction furnace 100 reactive elements and/or alloys can be introduced into furnace 100, including melt-containing vessel 130, as solid charges and inductively melted by supplying alternating current to induction coil 120 at suitable operating frequencies. Reactive alloy melt may be drawn from electric induction furnace 100 by any suitable means such as but not limited to top pouring or taping along a side of the furnace 100. Alternatively a heel of reactive element and/or alloy melt may be introduced into furnace 100 prior to melting solid charges or a heel of reactive element and/or alloy melt may be maintained in furnace 100 after drawing a quantity of reactive element and/or alloy melt from the furnace with additional solid charges added to the heel for continuous reactive element and/or alloy melt production in the furnace.

FIG. 1(*b*) illustrates in partial cross sectional side view another embodiment of an electric induction furnace 200 for melting and holding reactive metals and alloys that is a two-part furnace with a bottom-located inductor. Induction furnace 200 is capable of operating in a high and/or a low frequency mode ranging, for example, from a high frequency of 200 hertz to a low frequency of 80 hertz. In this embodiment electric induction furnace 200 includes upper furnace vessel 110 (partially shown in FIG. 1(*b*)), induction coil 320 positioned below upper furnace vessel 110; and lower melt-containing vessel 330 placed inside induction coil 320, with the interior volume of lower melt-containing vessel 330 communicably connected to the interior volume of upper furnace vessel 110. Identification of inductor furnace 405 as a bottom-located induction type refers to the positioning or placement of only the lower or melt-containing vessel 330 inside induction coil 320 rather than both melt-containing vessel 330 and upper furnace vessel 110.

In this embodiment of the invention lower melt-containing vessel 330 and induction coil 320 form parts of inductor furnace 405 where the interior volume of lower melt-containing vessel 330 is communicably connected to the interior volume of upper furnace vessel 110.

In this embodiment of the invention lower melt-containing vessel 330 comprises shell 412 that surrounds the outer side of vessel 330, permanent lining 338 and working lining 336. Permanent lining 338 may be a castable refractory or other suitable refractory. In the embodiment shown in FIG. 1(*b*) optional furnace rim blocks 411 and pusher block 413 are provided at the bottom of lower melt-containing vessel 330 to facilitate push out of working lining 336.

In one embodiment of the invention metallic shell 412 comprises vertically oriented bars of non-magnetic material, and is located so as to be surrounded by, but not touching, inside surface 360 of induction coil 320 to form gap 340 between inside surface 360 of induction coil 320 and the outside surface 350 of melt-containing vessel 330.

In this embodiment the interior of upper cooling duct 433, which includes discharge port 346, is in fluid communication with gap 340 and upper duct outlet conduit 901 is connected to the inlet of blower (or pump) 347.

In this embodiment insulative layer 361 contacts induction coil 320, and air gap 340 is located between outer surface 350 of shell 412 of the melt-containing vessel and insulative layer 361. In one embodiment insulative layer 361 may be a grout material. In this embodiment magnetic yokes are located behind (intermediate yoke 324*a*), above (upper yoke 324*b*) and below (lower yoke 324*c*) induction coil 320 and are supported in position via suitable fasteners such as yoke bolt assembly 326. In one embodiment the vertically oriented bars forming metallic shell 412 are electrically and mechanically joined together at their top ends above the upper yoke 324*b* and at their lower ends below lower yoke 324*c*.

In one embodiment of the invention optional spring loaded supports 426 are provided to allow movement of melt-containing vessel 330 due to thermal expansion and contraction of melt-containing vessel 330 during use of the vessel.

In one embodiment a furnace wall cooling fluid closed system is provided integral with inductor furnace 405. In this embodiment a suitable fluid circulation device such as blower (or pump) 347, optional filter/purifier 435 and heat exchanger 441 are located around the exterior side of melt-containing vessel 330. Lower cooling duct 439 is located below the bottom of melt-containing vessel 330 and is in fluid communication with feed port 345 for directing fluid flow from the outlet of heat exchanger 441 to feed port 345. In this embodiment fluid outlet conduit 901 supplies waste cooling fluid to the inlet of blower (or pump) 347 with fluid outlet conduit 903 connected to the inlet of optional filter/purifier 435 and the outlet of the optional filter/purifier connected to the inlet of heat exchanger 441 via inlet conduit 905. In other embodiments upper cooling duct 433 may be connected to the return (waste) of a fluid cooling system located remote from electric induction furnace 200 with lower cooling duct 439 connected to the supply of the fluid cooling system.

In one embodiment cooling fluid feed manifold 310 is provided below melt-containing vessel 330 for supply of heat exchanger cooling fluid and induction coil cooling fluid to heat exchanger 441 and interior passage (lumen) 335 of induction coil 320, respectively, and cooling fluid drain manifold 312 is provided below melt-containing vessel 330 for return (waste) of heat exchanger cooling fluid and induction coil cooling fluid from heat exchanger 441 and interior passage (lumen) 335 of induction coil 320, respectively.

In one embodiment melt-containing vessel 330 has a generally cylindrical shape with a representative interior diameter that can range from 10 inches to 50 inches depending, for example, on a furnace melt rate requirement. In other embodiments melt-containing vessel 330 may be of other shapes with range of interior dimensions as required for a particular application.

In the embodiment shown in FIG. 1(*b*) induction coil 320 is a coiled induction coil defined by one or more coils having an interior passage (lumen) 335 through which a cooling fluid medium such as a liquid coolant of water or glycol or a gaseous coolant such as a refrigerant is introduced (for example, by pumping the liquid coolant through opening 335). In another embodiment, induction coil 320 may be a solid core coil or an externally air cooled coil.

Illustrated in this embodiment of electric induction furnace 200 is gap 340 between the outside surface 350 of shell 412 of melt-containing vessel 330 and inside surface 360 of insulative layer 361 around induction coil 320. Gap 340 is operable to allow a furnace wall cooling fluid (either a liquid or gas) to be circulated with the fluid entering from feed port 345 and exiting from discharge port 346 with feed port 345 and discharge port 346 associated with gap 340, respectively. In one embodiment of electric induction furnace 200, gap 340 is at least one-half inch (0.5"), and preferably 1.25 inches to 1.5 inches wide. Circulated furnace wall fluid is introduced at feed port 345 and moves through gap 340 around the exterior of melt-containing vessel 330, exits at discharge port 346 and is then reintroduced into feed port 345 via a circulation loop that in one embodiment comprises blower (or pump) 347, optional filter/purifier 435 and heat exchanger 441. In one embodiment heat exchanger 441 is a gas/liquid heat exchanger where the furnace wall cooling fluid is a gas and the heat exchanger cooling liquid is glycol. It is desired that furnace wall cooling fluid is circulated or moved around a portion, in other embodiments an entire portion, or substantially an entire portion of melt-containing vessel 330. In this manner, the fluid is operable to cool an exterior of melt-containing vessel 330. To aid in the circulation of the cooling fluid around melt-containing vessel 330, baffles may be added that extend, for example, from the inside surface 360 of insulative layer 361 surrounding induction coil 320 and direct the fluid around outer surface 350 of melt-containing vessel 330.

The embodiment of the invention illustrated in FIG. 1(*b*) includes an annular discharge port around the upper side of melt-containing vessel 330 that is connected to an annular upper cooling duct, and an annular feed port below the bottom of melt-containing vessel 330 that is connected to an annular lower cooling duct with at least two blowers (or pumps) connecting the upper cooling duct to a heat exchanger that at least partially surrounds the outside wall of melt-containing vessel 330. In other embodiments the quantity and configurations of the feed and discharge ports, upper and lower cooling ducts, blowers or pumps, and heat exchanger can be different to accommodate a particular application while meeting the requirement of being a closed furnace wall cooling system integral with inductor furnace 405.

The fluid circulated through gap 340 can include any gas as disclosed for electric induction furnace 100. In one embodiment a representative circulation mechanism is run continuously so long as the furnace is at a temperature of 300° F. or over. The circulated gas exiting from discharge port 346 associated with melt-containing vessel 330, in one embodiment, is cooled in heat exchanger 441 and re-circulated back into the gap (that is, introduced into feed port 345 and gap 340). In one embodiment a representative flow rate of an inert gas used as the furnace wall cooling medium is of the order of 12,000 cfm and the temperature of the outer surface of the melt-containing vessel is maintained below 150° F. This assures maintaining a freeze plane of the molten reactive alloy well inside the working refractory lining 336 of the melt-containing vessel 330. In one embodiment, if the wall cooling fluid is a gas, moisture from the circulated gas may be removed, for example, to below 10 parts per million before it is recirculated with the use of an in-line dehumidifier, for example, connected to the inlet or outlet of heat exchanger 441.

As with induction furnace 100 by maintaining a freeze plane within melt-containing vessel 330, and preferably within the vessel wall, well away from an outer portion of the vessel wall, the opportunity for the reactive metal or alloy melt to escape from the vessel is inhibited in a properly operated furnace. Such escape and contact with induction coil 320 could otherwise be catastrophic.

Melt-containing vessel 330 can be provided with a reactive alloy melt resistant working lining 336 that, in one embodiment, has an electrical resistivity of between about 1,000 and about 10,000 micro ohm centimeters. In another embodiment, the resistivity is over 1,000,000 micro ohm centimeters. In one embodiment, a working lining of melt-containing vessel 330 is a refractory ceramic.

To detect leak or bleed out of molten reactive metal or alloy from melt-containing vessel 330, at least one electrical conducting grid (net) of mica clad electrical conductors is placed at or about the interface between working lining 336 and permanent lining 338 of the melt-containing vessel 330, and the electrically conducting grid defined by the net is connected to an electrical circuit to detect leakage of the melt. Such circuit may be linked to an alarm through, for example, a controller. Representatively, the mica grid is connected to an alarm system and works as a leak detection device by completing the electrical circuit between the molten reactive metal or alloy and the furnace system's electrical ground potential when the leaked metal touches the mica grid. In one embodiment, to assure further safety of operation, multiple grids of mica clad conductor net are placed in at least three locations including: the outer interface between replaceable working lining 336 and permanent lining 338 of melt-containing vessel 330; bottom 342 of melt-containing vessel 330 at the working lining bottom boundary above optional pusher block 413; and at inside surface 360 of induction coil 320. In another embodiment a leak detector grid of mica clad conductor net is also provided at the bottom 316 of inductor furnace 405.

Upper furnace vessel 110 and melt-containing vessel 330 are communicably connected by a suitable connecting means, such as interface ring 170 of, for example, silicon carbide and thermal ring-shaped gasket 180. The mating interface may be further sealed with one or more rope gaskets 190 (for example, titanium rope gaskets).

Electric induction furnace 200 may be of the tilting type similar to electric induction furnace 100. All elements associated with upper furnace vessel 110 for induction furnace 100, including the refractory lined interior and furnace atmosphere may also be used with induction furnace 200.

In one use of electric induction furnace 200 reactive elements and/or alloys can be introduced into furnace 200, including melt-containing vessel 330, as solid charges and inductively melted by supplying alternating current to induction coil 320 at suitable operating frequencies. Reactive alloy melt may be drawn from electric induction furnace 200 by any suitable means such as but not limited to top pouring or taping along a side of furnace 200. Alternatively a heel of reactive element and/or alloy melt may be introduced into furnace 200 prior to melting solid charges or a heel of reactive element and/or alloy melt may be maintained in furnace 200 after drawing a quantity of reactive element and/or alloy melt from the furnace with additional solid charges added to the heel for continuous reactive element and/or alloy melt production in the furnace.

Figure 2A:
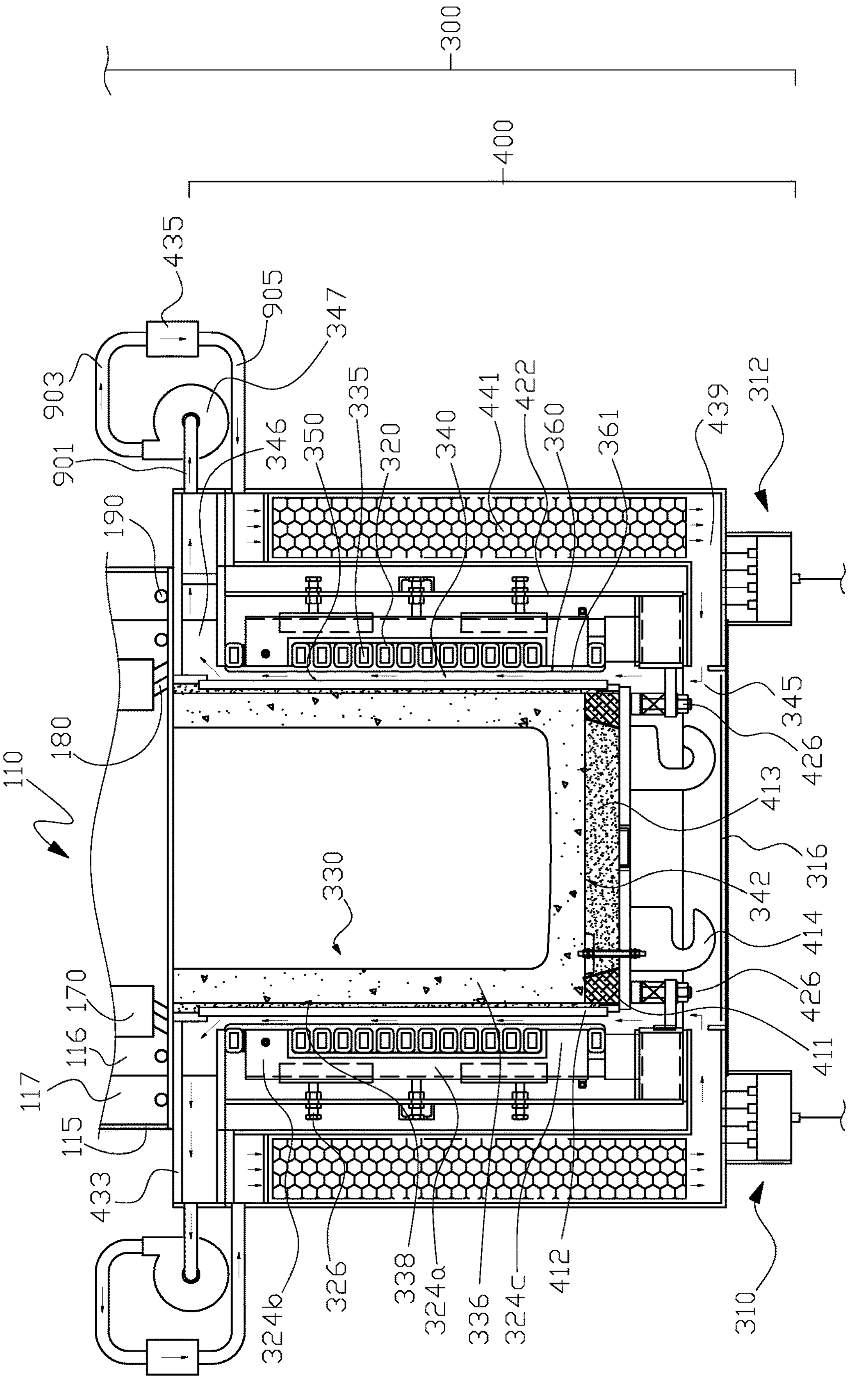
FIG. 2(*a*) is a partial cross sectional view of another embodiment of an electric induction furnace of the present invention.
Figure 2B:
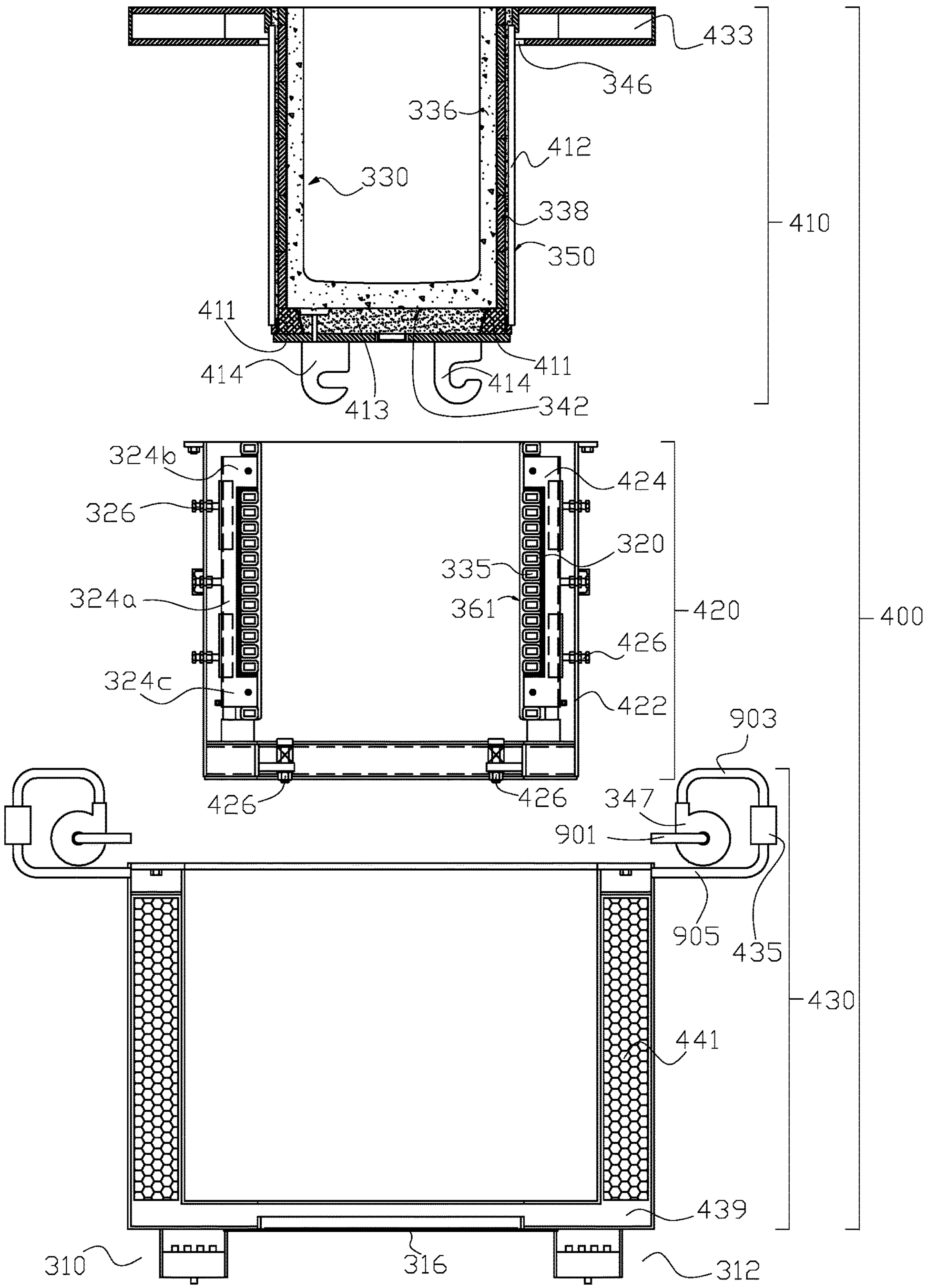
Figure 2C:
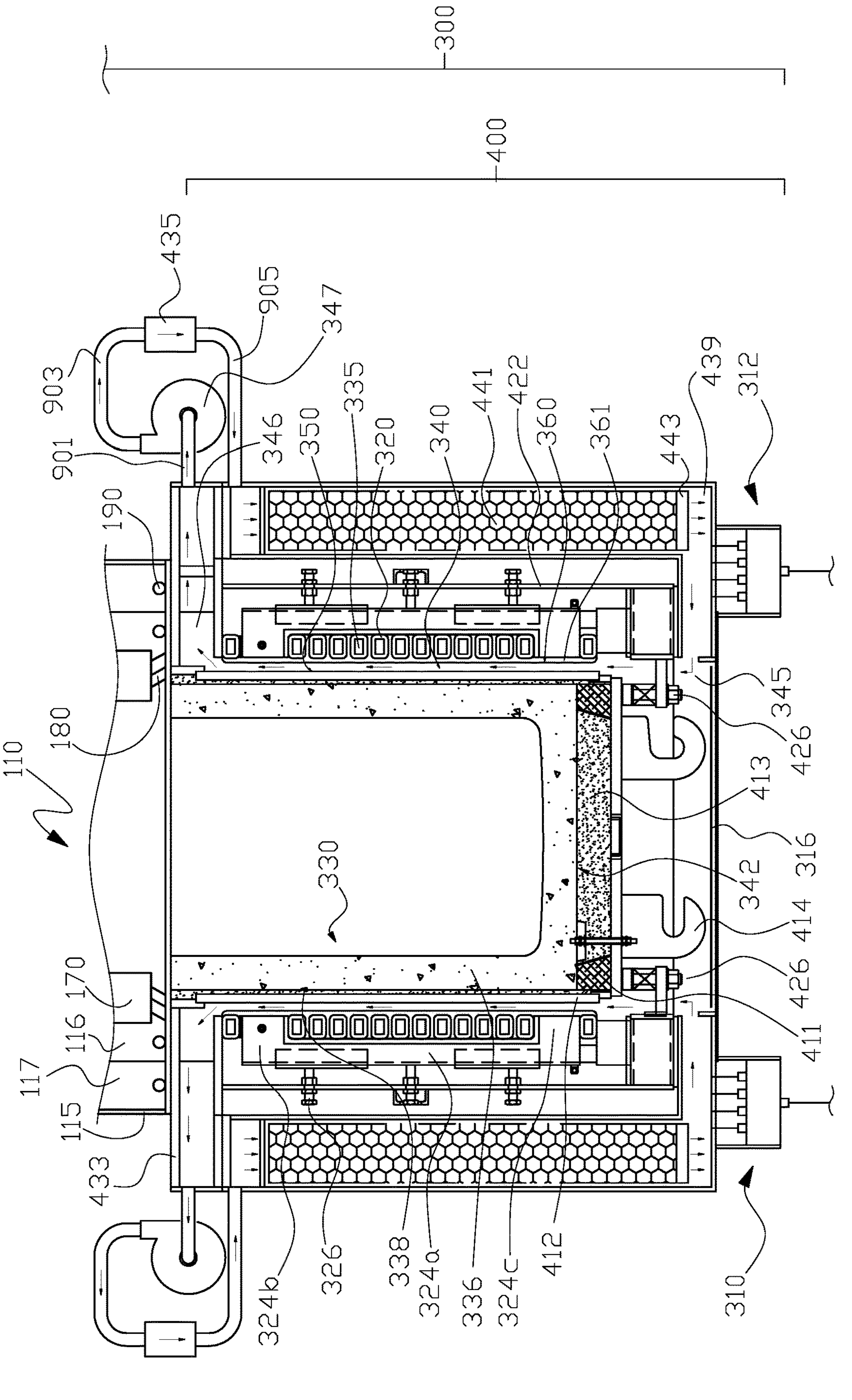
Figure 3A:
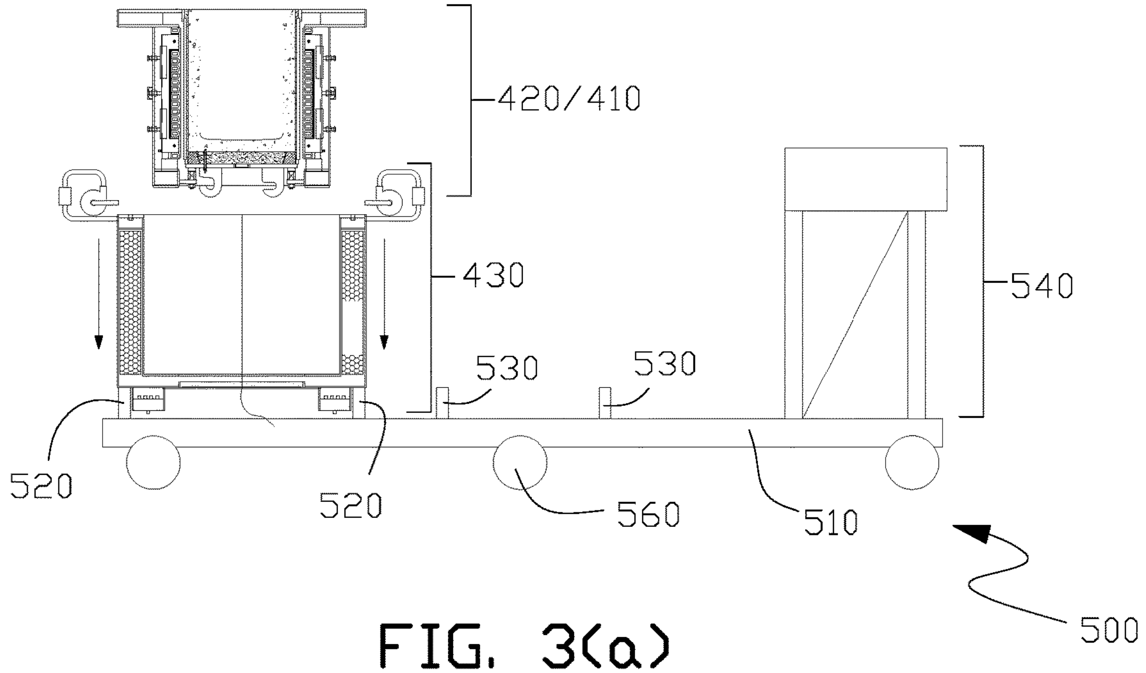
FIG. 3(*a*) through FIG. 3(*d*) are cross-sectional views of one embodiment of a furnace serving system for an electric induction furnace of the present invention.
Figure 3B:
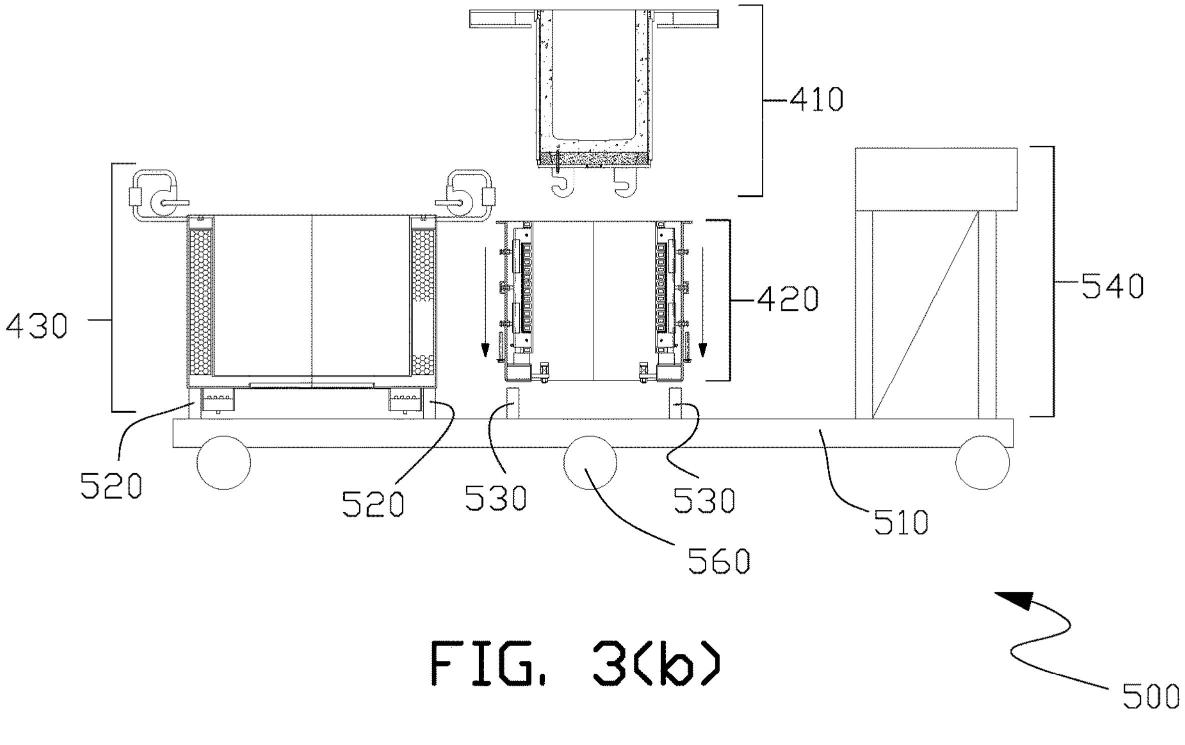
Figure 3C:
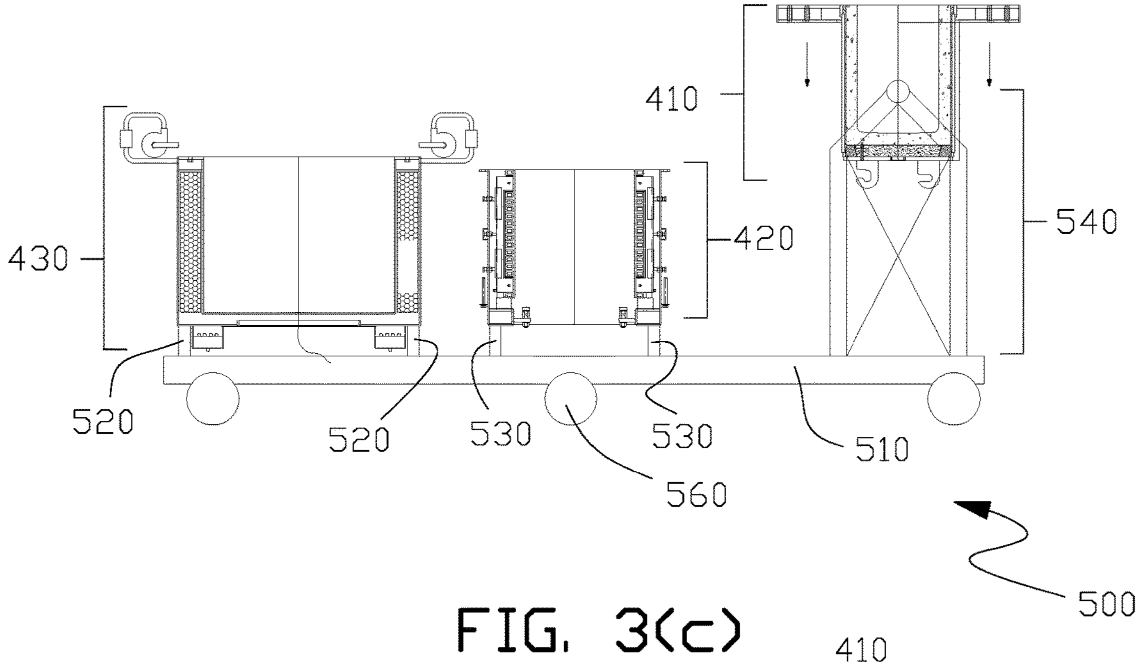
Figure 3D:
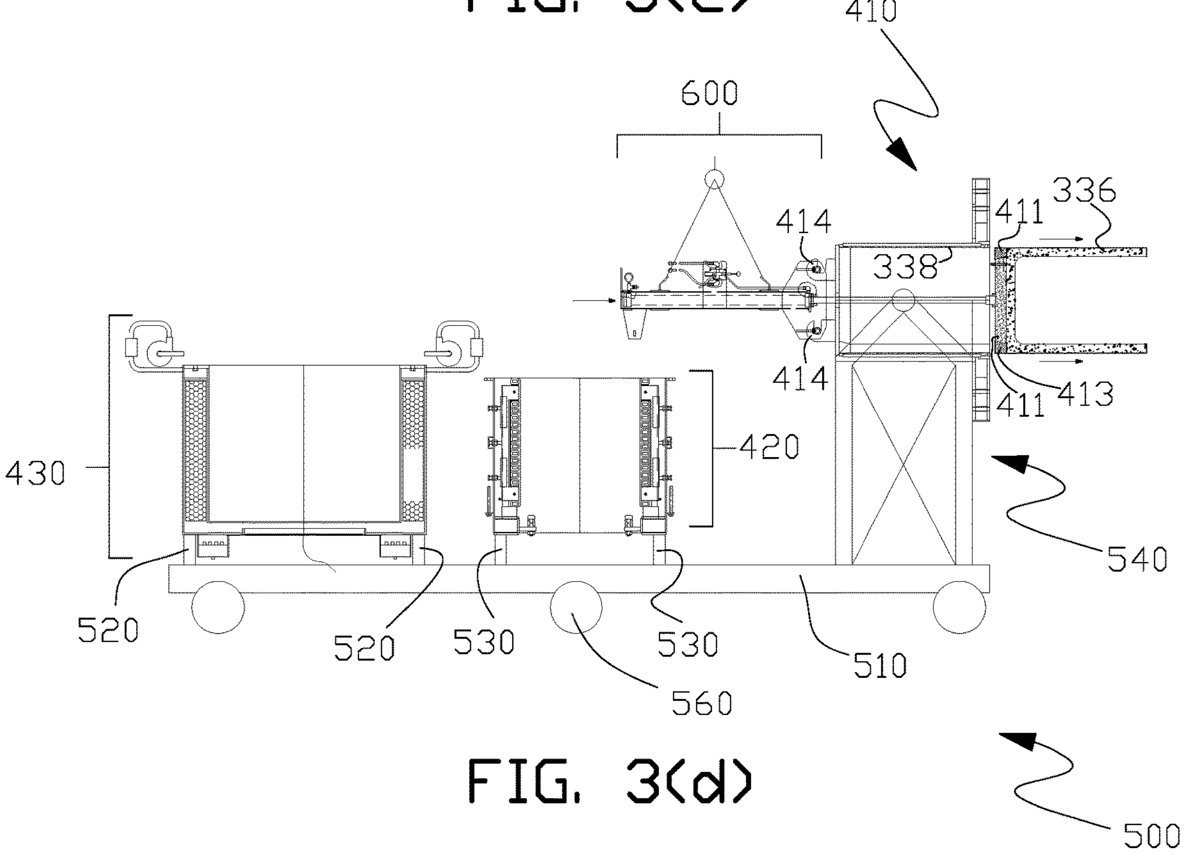

FIG. 2(*a*) illustrates in partial cross sectional side view another embodiment of an electric induction furnace 300 for melting and holding reactive metals or alloys that is a two-part furnace with a bottom-located inductor. Induction furnace 300 is capable of operating in a high and/or a low frequency mode ranging, for example, from a high frequency of 200 hertz to a low frequency of 80 hertz. In this embodiment electric induction furnace 300 includes upper furnace vessel 110 (partially shown in FIG. 2(*a*)), induction coil 320 positioned below upper furnace vessel 110; and lower melt-containing vessel 330 placed inside induction coil 320, with the interior volume of lower melt-containing vessel 330 communicably connected to the interior volume of upper furnace vessel 110. Identification of inductor furnace 400 as a bottom-located induction type refers to the positioning or placement of only the lower or melt-containing vessel 330 inside induction coil 320 rather than both melt-containing vessel 330 and upper furnace vessel 110.

In this embodiment of the invention lower melt-containing vessel 330 and induction coil 320 form parts of a modular inductor furnace. In one embodiment modular inductor furnace 400 comprises: upper furnace module 410; induction coil module 420; and lower furnace module 430 as shown separated from each other in FIG. 2(*b*).

In this embodiment upper furnace module 410 comprises lower melt-containing vessel 330 and upper cooling duct 433; induction coil module 420 comprises induction coil 320; and lower furnace module 430 comprises lower cooling duct 439 and heat exchanger 441 as shown in cross sectional side view in FIG. 2(*b*) when the modules are separated from each other.

When the interior volume of lower melt-containing vessel 330 in upper furnace module 410 is communicably connected to the interior volume of upper furnace vessel 110, induction coil module 420 is connected to upper furnace module 410, and the lower furnace module 430 is connected to the induction coil module and the upper furnace module an assembled modular inductor furnace 400 is formed as shown in cross sectional view in FIG. 2(*a*).

In this embodiment of the invention lower melt-containing vessel 330 comprises shell 412 that surrounds the outer side of vessel 330, permanent lining 338 and working lining 336. Permanent lining 338 may be a castable refractory or other suitable refractory. In the embodiment shown in FIG. 2(*a*) and FIG. 2(*b*) optional furnace rim blocks 411, pusher block 413 and upper furnace module hooks 414 are provided at the bottom of melt-containing vessel 330 to facilitate push out of working lining 336.

In one embodiment of the invention metallic shell 412 comprises vertically oriented bars of non-magnetic material, and is located so as to be surrounded by, but not touching, inside surface 360 of induction coil 320 when induction coil module 420 is connected to upper furnace module 410 to form gap 340 between inside surface 360 of induction coil 320 and the outside surface 350 of melt-containing vessel 330.

The interior of upper cooling duct 433, which includes discharge port 346, is in fluid communication with gap 340 and upper duct outlet conduit 901 is connected to the inlet of blower (or pump) 347 when modular inductor furnace 400 is assembled as shown in FIG. 2(*a*).

In this embodiment induction of the invention coil module 420 surrounds shell 412, but is separated therefrom by an insulative layer 361 that contacts induction coil 320, and air gap 340 is located between the outer surface 350 of shell 412 and insulative layer 361 when induction coil module 420 is connected to upper furnace module 410. In one embodiment insulative layer 361 may be a grout material. In addition to providing a fluid flow path between shell 412 and insulative layer 361, air gap 340 also facilitates the removal or separation of the lower melt-containing vessel 330 from the induction coil module so that working lining 336 may be conveniently removed. In this embodiment induction coil module enclosure 422 is provided around induction coil 320 with magnetic yokes that are behind (intermediate yoke 324*a*), above (upper yoke 324*b*) and below (lower yoke 324*c*) induction coil 320 and are supported in position via suitable fasteners such as yoke bolt assembly 326. In one embodiment the bars forming metallic shell 412 are electrically and mechanically joined together at their top ends above the upper yoke 324*b* and their bottom ends below the lower yoke 324*c* when the induction coil module is connected to the upper furnace module.

In one embodiment of the invention optional spring loaded supports 426 are provided in induction coil module 420 for mounting of the upper furnace module to allow for thermal expansion and contraction of upper furnace module 410 during use of lower melt-containing vessel 330.

In this embodiment of the invention lower furnace module 430 comprises a suitable fluid circulation device such as blower (or pump) 347, optional filter/purifier 435, heat exchanger 441 and lower cooling duct 439 with its interior in fluid communication with feed port 345 for directing fluid flow from the outlet of heat exchanger 441 to the feed port 345 when modular inductor furnace 400 is assembled as shown in FIG. 2(*a*). In this embodiment fluid outlet conduit 901 supplies waste cooling fluid to the inlet of blower (or pump) 347 with fluid outlet conduit 903 connected to the inlet of optional filter/purifier 435 and the outlet of the optional filter/purifier connected to the inlet of heat exchanger 441 via inlet conduit 905. In other embodiments upper cooling duct 433 may be connected to the return (waste) of a fluid cooling system located remote from electric induction furnace 400 with the lower cooling duct 439 connected to the supply of the fluid cooling system.

In one embodiment lower furnace module 430 also comprises cooling fluid feed manifold 310 for supply of heat exchanger cooling fluid and induction coil cooling fluid to heat exchanger 441 and interior passage (lumen) 335 of induction coil 320, respectively, and cooling fluid drain manifold 312 is provided for return (waste) of heat exchanger cooling fluid and induction coil cooling fluid from heat exchanger 441 and interior passage (lumen) 335 of induction coil 320, respectively.

In one embodiment melt-containing vessel 330 has a generally cylindrical shape with a representative interior diameter that can range from 10 inches to 50 inches depending, for example, on a furnace melt rate requirement. In other embodiments melt-containing vessel 330 may be of other shapes with range of interior dimensions as required for a particular application.

In the embodiment shown in FIG. 2(*a*) and FIG. 2(*b*) induction coil 320 is a coiled induction coil defined by one or more coils having an interior passage (lumen) 335 through which a cooling fluid medium such as a liquid coolant of water or glycol or a gaseous coolant such as a refrigerant is introduced (for example, by pumping the liquid coolant through opening 335). In another embodiment, induction coil 320 may be a solid core coil or an externally air cooled coil.

Illustrated in this embodiment of electric induction furnace 300 is gap 340 between the outside surface 350 of shell 412 of melt-containing vessel 330 and inside surface 360 of insulative layer 361 around induction coil 320. Gap 340 is operable to allow a furnace wall cooling fluid (either a liquid or gas) to be circulated with the fluid entering from feed port 345 and exiting from discharge port 346 with feed port 345 and discharge port 346 associated with gap 340, respectively. In one embodiment of electric induction furnace 300, gap 340 is at least one-half inch (0.5"), and preferably 1.25 inches to 1.5 inches wide. Circulated furnace wall fluid is introduced at feed port 345 and moves through gap 340 around the exterior of melt-containing vessel 330, exits at discharge port 346 and is then reintroduced into feed port 345 via a circulation loop that in this embodiment comprises blower (or pump) 347, optional filter/purifier 435 and heat exchanger 441. In one embodiment heat exchanger 441 is a gas/liquid heat exchanger where the furnace wall cooling fluid is a gas and the heat exchanger liquid is glycol. It is desired that the furnace wall cooling fluid is circulated or moved around a portion, in other embodiments an entire portion, or substantially an entire portion of melt-containing vessel 330. In this manner, the fluid is operable to cool an exterior of melt-containing vessel 330. To aid in the circulation of the cooling fluid around melt-containing vessel 330, baffles may be added that extend, for example, from the inside surface 360 of insulative layer 361 surrounding induction coil 320 and direct the fluid around outer surface 350 of melt-containing vessel 330.

The embodiment of the invention illustrated in FIG. 2(*a*) and FIG. 2(*b*) includes an annular discharge port around the upper side of melt-containing vessel 330 that is connected to an annular upper cooling duct, and an annular feed port below the bottom of melt-containing vessel 330 that is connected to an annular lower cooling duct with at least two blowers (or pumps) connecting the upper cooling duct to a heat exchanger that at least partially surrounds the outside wall of the melt-containing vessel 330. In other embodiments the quantity and configuration of the feed and discharge ports, upper and lower cooling ducts, blowers or pumps, and heat exchanger can be different to accommodate a particular application while meeting the requirement of being a furnace wall closed cooling system integral with an assembled modular inductor furnace 405.

The fluid circulated through gap 340 can include any gas as disclosed for electric induction furnace 100. In one embodiment a representative circulation mechanism is run continuously so long as the furnace is at a temperature of 300° F. or over. The circulated gas exiting from discharge port 346 associated with melt-containing vessel 330, in one embodiment, is cooled in heat exchanger 441 and re-circulated back into the gap (that is, introduced into feed port 345 and gap 340). In one embodiment a representative flow rate of an inert gas is of the order of 12,000 cfm and the temperature of the outer surface of the melt-containing vessel is maintained below 150° F. This assures maintaining a freeze plane of the molten reactive alloy well inside the working refractory lining 336 of the melt-containing vessel 330. In one embodiment, if the wall cooling fluid is a gas, moisture from the circulated gas may be removed, for example, to below 10 parts per million, before it is recirculated with the use of an in-line dehumidifier, for example, connected to the inlet or outlet of heat exchanger 441 as illustrated, for example, by in-line dehumidifier 443 connected to the outlet of the heat exchanger in FIG. 2(*c*).

As with induction furnace 100 by maintaining a freeze plane within melt-containing vessel 330, and preferably within the vessel wall, well away from an outer portion of the vessel wall, the opportunity for reactive alloy melt to escape from the vessel is inhibited in a properly operated furnace. Such escape and contact with induction coil 320 could otherwise be catastrophic.

Melt-containing vessel 330 can be provided with a reactive alloy melt resistant working lining 336 that, in one embodiment, has an electrical resistivity of between about 1,000 and about 10,000 micro ohm centimeters. In another embodiment, the resistivity is over 1,000,000 micro ohm centimeters. In one embodiment, a working lining of melt-containing vessel 330 is a refractory ceramic.

To detect leak or bleed out of molten reactive metal or alloy from melt-containing vessel 330, at least one electrical conducting grid (net) of mica clad electrical conductors is placed at or about the interface between working lining 336 and permanent lining 338 of the melt-containing vessel 330, and the electrically conducting grid defined by the net is connected to an electrical circuit to detect leakage of the melt. Such circuit may be linked to an alarm through, for example, a controller. Representatively, the mica grid is connected to an alarm system and works as a leak detection device by completing the electrical circuit between the molten reactive metal or alloy and furnace system's electrical ground potential when the leaked metal touches the mica grid. In one embodiment, to assure further safety of operation, multiple grids of mica clad conductors are placed in at least three locations including: the outer interface between replaceable working lining 336 and permanent lining 338 of melt-containing vessel 330; bottom 342 of melt-containing vessel 330 at the working lining bottom boundary above optional pusher block 413; and at inside surface 360 of induction coil 320. In another embodiment a leak detector grid of mica clad conductor net is also provided at the bottom 316 of lower furnace module 430.

Upper furnace vessel 110 and upper furnace module 410, which contains melt-containing vessel 330 during operation of electric induction furnace 300 when the upper furnace vessel 110 and upper furnace module 410 are communicably connected by a suitable connecting means, such as interface ring 170 of, for example, silicon carbide and thermal ring-shaped gasket 180. The mating interface may be further sealed with one or more rope gaskets 190 (for example, titanium rope gaskets). Alternative connecting means can be provided in other embodiments to suit connection of modular inductor furnace 410 to upper furnace vessel 110.

Electric induction furnace 300 may be of the tilting type similar to electric induction furnace 100 or furnace 200. All elements associated with upper furnace vessel 110 for induction furnace 100, including the refractory lined interior and furnace atmosphere may also be used with induction furnace 300.

In one use of electric induction furnace 300 reactive elements and/or alloys can be introduced into furnace 300, including melt-containing vessel 330, as solid charges and inductively melted by supplying alternating current to induction coil 320 at suitable operating frequencies. Reactive alloy melt may be drawn from electric induction furnace 300 by any suitable means such as but not limited to top pouring or taping along a side of the furnace 300. Alternatively a heel of reactive element and/or alloy melt may be introduced into furnace 300 prior to melting solid charges or a heel of reactive element and/or alloy melt may be maintained in furnace 300 after drawing a quantity of reactive element and/or alloy melt from the furnace with additional solid charges added to the heel for continuous reactive element and/or alloy melt production in the furnace.

In one embodiment of the invention when modular inductor furnace 400 shown in FIG. 2(*a*) and FIG. 2(*b*) is utilized, servicing (including replacement or maintenance procedures) can include use of integrated service cart 500 as shown in FIG. 3(*a*) through FIG. 3(*d*). In these figures only modules of inductor furnace 400, which are serviced, are shown. Servicing begins with an assembled modular electric induction furnace 300 as shown in FIG. 2(*a*).

In this embodiment service cart 500 comprises a flatbed wheel-mounted carriage 510 having module seating fittings suitably connected to the flatbed and preferably sequentially positioned in the order shown in the figures, namely lower furnace module fittings 520; induction coil module fittings 530 and upper furnace module fittings 540 to facilitate sequential removal or installation of the furnace modules. The carriage wheels 560 may accommodate installation on rails or may be free wheeling where either the carriage is integral to a powered vehicle or detachably secured to a separate powered vehicle.

The bottom of the assembled modular electric induction furnace 300 (also the bottom of lower inductor furnace 400) may be raised above grade (floor level) or a service pit may be provided below grade to allow the service cart access below lower furnace module 430 of induction furnace 300 as shown in the figures.

Lower inductor furnace module 430 (which is suitably connected to the induction coil module and/or the upper furnace module when furnace 300 is in service) can be disconnected from induction coil module 420 and/or upper furnace module 410 (attachment to upper furnace vessel 110 not shown in FIG. 3(*a*)), and lowered onto lower furnace module fittings 520 on service cart 500 when positioned under furnace 300 as shown in FIG. 3(*a*). If removal of the induction coil module is required, service cart 500 can be repositioned to locate induction coil module fittings 530 below the attached induction coil module (which is suitably connected to the upper furnace module when furnace 300 is in service) as shown in FIG. 3(*b*), and the induction coil module 420 can be disconnected from upper furnace module 410, and lowered onto the induction coil module fittings 530 on the service cart as shown in FIG. 3(*b*). If removal of the upper furnace module 410 (which is suitably connected to upper furnace vessel 110 when furnace 300 is in service) is required, service cart 500 can be repositioned to locate upper furnace module fittings 540 below the upper furnace module 410 as shown in FIG. 3(*c*) and the upper furnace module can be disconnected from the upper furnace vessel 110, and lowered onto the upper furnace module fittings 540 on the service cart as shown in FIG. 3(*c*). Lowering of the lower furnace module 430, induction coil module 420 and upper furnace module 410 onto service cart 500 can be accomplished with a suitable mechanical lift apparatus. In one embodiment a scissor jack apparatus can be adopted to the fittings for each module on the service cart for removing (lowering) existing furnace modules and installing (raising) replacement modules.

In one embodiment upper furnace module fittings 540 includes upper furnace module repositioning apparatus to reposition upper furnace module 410 on the upper furnace module fittings as required for engagement of furnace working lining push out apparatus 600 to remove working lining 336 from the lower melt-containing vessel 300 as shown in FIG. 3(*d*) where the axial length of the upper furnace module 410 is rotated 90 degrees from horizontal to vertical orientation by the upper furnace module repositioning apparatus. In one embodiment a suitable working lining push out apparatus 600 is a hydraulic ram that engages upper furnace module hooks 414 so that the hydraulic ram pushes out worn working furnace lining 336 with the upper furnace module 410 located on upper furnace module fittings 540 by pushing on rim blocks 411 and pusher block 413 as shown in FIG. 3(*d*).

After the upper furnace module 410 has been removed from furnace 300, service cart 500 can be used to install a spare upper furnace module with new working liner, or alternatively spare or repaired upper and/or lower furnace modules.

Alternatively the service cart can comprise a single module removal or installation cart where appropriate modular fittings (upper or lower module fittings or induction coil module fittings) can be attached and interchanged to accommodate each furnace module on the single module service cart.

Alternatively the service cart can comprise an assembled inductor furnace removal or installation cart with appropriate fittings to remove the assembled inductor furnace from upper furnace vessel 110 with separation of the individual furnace modules remote from the location of the upper furnace vessel.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. A method of cooling a melt-containing vessel in a modular inductor furnace configured for removable connection to an upper furnace vessel comprising a thermally-insulated containment vessel for a reactive alloy or metal, the modular inductor furnace comprising an upper inductor furnace module, an induction coil furnace module and a lower inductor furnace module, the method comprising:

connecting the upper inductor furnace module to the upper furnace vessel, the upper inductor furnace module comprising an upper cooling duct and the melt-containing vessel, the melt-containing vessel in fluid communication with the upper furnace vessel;

forming a gap between an outside surface of the melt-containing vessel and an inside surface of an induction coil contained in the induction coil furnace module by inserting the upper inductor furnace module containing the melt-containing vessel into the induction coil furnace module, the induction coil furnace module having an induction coil enclosure surrounding an exterior of the induction coil;

inserting the induction coil furnace module into a heat exchanger of the lower inductor furnace module, the lower inductor furnace module having a lower cooling duct;

forming at least one cooling fluid feed port and at least one cooling fluid discharge port in fluid communication with an opposing ends of the gap at the upper cooling duct and the lower cooling duct;

connecting the at least one cooling fluid feed port to a supply of a cooling fluid;

connecting the at least one cooling fluid discharge port to a return of the cooling fluid; and circulating the cooling fluid though the gap to cool the outside surface of the melt-containing vessel.

2. The method of claim 1 further comprises flowing the cooling fluid in the gap around a circumference of the melt-containing vessel by forming the upper cooling duct and the lower cooling duct as annular ducts.

3. The method of claim 1 further comprising locating the supply and the return of the cooling fluid integral to the modular inductor furnace.

4. The method of claim 1 further circulating the cooling fluid from an outlet of the heat exchanger to the gap and returning the cooling fluid from the gap to an inlet of the heat exchanger.

5. The method of claim 1 further comprising:

forming an outer shell from the outside surface of the melt-containing vessel from a plurality of vertically oriented bars of a non-magnetic material surrounded by the inside surface of the induction coil; and electrically and mechanically joining together at a top end of each of the plurality of vertically oriented bars and at a bottom end of each of the plurality of vertically oriented bars.

6. The method of claim 1 further comprises circulating the cooling fluid through the gap with at least one blower or at least one pump on the upper or the lower inductor furnace module.

7. The method of claim 1 wherein the supply of the cooling fluid comprises at least one inert gas selected from the group consisting of argon, helium, neon, krypton, xenon, and radon circulated through the gap between the inside surface of the induction coil and the outside surface of the melt-containing vessel.

8. The method of claim 1 wherein the supply of the cooling fluid comprises air.

9. The method of claim 1 further comprising maintaining a freeze plane within a surface of the melt-containing vessel.

10. The method of claim 9 further comprising maintaining the freeze plane with a temperature of the cooling fluid in the gap below 150° F.

11. The method of claim 1 where the cooling fluid is a gas and the method further comprises purifying the gas through a purifier disposed on the lower inductor furnace module before the gas is re-circulated through the heat exchanger.

12. The method of claim 11 further comprising dehumidifying the gas to remove moisture in the gas to below 10 parts per million.

13. The method claim 1 further comprising:

internally cooling the induction coil with a coil cooling fluid supplied from a coil and heat exchanger cooling fluid feed manifold in the lower inductor furnace module to the induction coil and the coil cooling fluid returned to the coil and heat exchanger cooling fluid return manifold in the lower inductor furnace module; and cooling the heat exchanger with a heat exchanger cooling fluid supplied from the coil and heat exchanger cooling fluid feed manifold in the lower inductor furnace module and the heat exchanger cooling fluid returned to the coil and heat exchanger cooling fluid return manifold in the lower inductor furnace module.

14. The method of claim 1 further comprising detecting leakage of the reactive alloy or metal from the melt-containing vessel with at least one electrical conducting grid of a mica clad electrical conductors on the outside surface of the melt-containing vessel with each of the at least one electrical conducting grid of the mica clad electrical conductors connected to an electrical leak detection circuit.

15. The method of claim 14 further comprising detecting leakage of the reactive alloy or metal from the melt-containing vessel with the at least one electrical conducting grid of the mica clad electrical conductors on a bottom of the melt-containing vessel and on an inner periphery of the inside surface of the induction coil with each of the at least one electrical conducting grid of the mica clad electrical conductors connected to the electrical leak detection circuit.

16. A method of cooling an electric induction reactive metal or alloy melting and holding furnace comprising:

an upper furnace vessel; and an inductor furnace disposed below the upper furnace vessel;

wherein the inductor furnace comprises a separable modular inductor furnace comprising:

an upper inductor furnace module configured for removable connection to the upper furnace vessel, the upper inductor furnace module comprising:

an upper cooling duct; and a melt-containing vessel for containment of a reactive metal or alloy melt, the melt-containing vessel communicably connected to the upper furnace vessel when connected to the upper furnace vessel;

an induction coil module configured for removable connection to the upper inductor furnace module, the induction coil module comprising:

an induction coil; and an enclosure surrounding the induction coil, the melt-containing vessel configured for positioning inside the induction coil, to form a gap between an outside surface of the melt-containing vessel and an inside surface of the induction coil with at least one feed port, and at least one discharge port disposed at opposing upper and lower ends of the gap, the upper cooling duct in fluid communication with the at least one discharge port or the at least one feed port disposed at the upper end of the gap when connected to the upper inductor furnace module; and a lower inductor furnace module configured for removable connection around the induction coil module, the lower inductor furnace module comprising:

a lower cooling duct in fluid communication with the at least one feed port or the at least one discharge port disposed at the lower end of the gap;

the method comprising:

introducing a fluid into the gap between the induction coil and the melt-containing vessel when the melt-containing vessel is positioned inside the induction coil with the upper inductor furnace module connected to the upper furnace vessel, the induction coil module is connected to the upper inductor furnace module and the lower inductor furnace module is connected around the induction coil module; and circulating the fluid through the gap.

17. The method of claim 16 wherein the fluid is operable to cool a surface of the melt-containing vessel when the reactive metal or alloy melt is contained within the melt-containing vessel.

18. The method of claim 16 wherein circulating the fluid through the gap comprises introducing the fluid discharged from the discharge port associated with the gap into the feed port associated with the gap.

19. The method of claim 16 wherein prior to introducing the fluid into the feed port, the method comprises reducing a temperature of the fluid.

* * * * *